United States Patent [19]
Heeb et al.

[11] Patent Number: 5,997,929
[45] Date of Patent: Dec. 7, 1999

[54] EXTRACTION PROCESS

[75] Inventors: Thomas G. Heeb, Marysville; Zenon Ioannis Mandralis, Dublin, both of Ohio

[73] Assignee: Nestec S.A., Vevey, Switzerland

[21] Appl. No.: 08/962,696

[22] Filed: Nov. 3, 1997

[51] Int. Cl.[6] .............................. A23F 5/00; A23L 1/28; A23L 1/20; B01D 37/00
[52] U.S. Cl. ...................... 426/433; 426/425; 426/431; 426/432; 426/434; 210/767; 210/768
[58] Field of Search .................................. 426/433, 432, 426/434, 425, 431; 210/767, 768

[56] References Cited

U.S. PATENT DOCUMENTS

| | | | |
|---|---|---|---|
| 2,629,663 | 2/1953 | Folger et al. | 99/71 |
| 3,148,069 | 9/1964 | Sjogren et al. | 99/71 |
| 3,862,347 | 1/1975 | Thijssen | 426/434 |
| 4,830,645 | 5/1989 | Ghodsizadeh et al. | 62/541 |
| 5,151,287 | 9/1992 | Schlecht et al. | 426/434 |

*Primary Examiner*—Anthony J. Weier
*Attorney, Agent, or Firm*—Pennie & Edmonds LLP

[57] ABSTRACT

A process for the continuous extraction of water soluble solids from solid particles containing them for providing an extract product in one or more extraction stages. In each extraction stage, a slurry containing particles to be extracted and extract is introduced into an extraction reactor to form an upwardly moving packed bed. Particles are scraped from the packed bed for defining an upper surface of the packed bed. An extraction liquid is introduced into the extraction reactor above the upper surface of the packed bed. A portion of the extraction liquid percolating through the packed bed for extracting water soluble substances from the particles in the packed bed and forming an extract. The remaining portion of the extraction liquid entrains the particles scraped from the packed bed for providing a spent particles slurry. The spent particles slurry is removed from the extraction reactor. Extract is removed from below the packed bed and at least a portion of the extract forms the extract product. The extraction stages may be separated by one or more solubilization stages. Examples of water soluble substances are soluble coffee solids or soluble tea solids.

21 Claims, 4 Drawing Sheets

EXTRACTION PROCESS

FIELD OF THE INVENTION

This invention relates to a continuous, counter-current process for the extraction of water soluble substances from solids containing them. The invention also relates to the water soluble substances produced by the process. The water soluble substances may, for example, be soluble coffee and tea solids.

BACKGROUND TO THE INVENTION

Soluble coffee and tea powders are usually prepared by extracting soluble solids from roast and ground coffee or tea leaves, concentrating the extract so obtained, and drying the extract to powder, either by spray-drying or freeze drying. To increase yields to commercially acceptable levels, the extraction is usually carried out in two or more steps. In the first step, readily soluble matter is extracted from the roast and ground coffee or tea leaves. In subsequent steps, insoluble carbohydrates remaining in the partially extracted grounds or leaves are solubilized using thermal solubilization and further extracted; either simultaneously or in separate solubilization and extraction stages.

The extraction is traditionally carried out in a battery of fixed bed reactors in a counter-current manner. An extraction liquid, usually hot water, is introduced into the fixed bed reactor which contains the most extracted coffee grounds or tea leaves and flows from one reactor to the next, leaving the battery after the reactor which contains the freshest grounds or leaves. After a certain time, the process is halted and the reactor which contains the most extracted grounds or leaves is disconnected from the battery. A reactor which contains fresh grounds or leaves is then connected to the opposite end of the battery and the process is repeated.

The traditional process works well but suffers the disadvantage that it is not continuous while the downstream production steps are substantially continuous. Further, the extracted grounds or leaves must be dug out or blown out of the reactor, which is removed from the battery, prior to the reactor being re-filled with fresh grounds or leaves. Also extraction and solubilization are essentially coupled in the traditional process. Therefore the solubilization conditions cannot be adjusted independently from the extraction conditions. This, along with high pressure drops over the fixed bed reactors, prevents the use of potentially advantageous solubilization conditions. Further, these problems often lead to the grounds or leaves having long residence times in the extraction process, which is detrimental to product quality and leads to tars which foul equipment. Therefore, there have been many attempts over the years to replace the traditional process with a continuous process and to decouple extraction from solubilization. None of these attempts have been overly successful.

One attempt is described in U.S. Pat. No. 2,629,663. In the process described in this patent, the coffee grounds are fed into a tubular reactor which contains an auger. The auger then transports the coffee grounds through the reactor. Extraction liquid is caused to flow through the reactor, counter-current to the coffee grounds. The reactor has several zone of differing diameter to prevent plugging of the reactor due to swelling of the grounds. A problem with this process is that the mechanical action of the auger on the coffee grounds is likely to generate fines. Also low extraction temperatures are used and there is no solubilization. The process is unable to produce products of commercial interest today.

Another attempt is disclosed in U.S. Pat. No. 3,862,347. In the process described in this patent, coffee grounds are slurried with a concentrated coffee extract and introduced into the bottom of a tubular reactor. A cold, dilute coffee extract is introduced into the top of the tubular reactor as an extraction liquid. Hollow blades rotate in the tubular reactor near its bottom. Extraction liquid travelling down the reactor is drawn off through the blades. The blades also serve to transport the coffee grounds upwards. Once the coffee grounds are transported above the hollow blades, the grounds form a packed bed which moves upwards against the flow of the extraction liquid. The temperature within the bed is carefully controlled so that the viscosity of the extraction liquid decreases or remains the same as it travels down through the bed. However, the process described in the patent is an attempt to mechanically optimize the system by reducing channeling. The process does not improve the flavor of the extracted coffee. The arrangement of column and the blades is such that the ratio of the height of the packed bed to the diameter of the column is above about 7:1. Hence the residence time of the extract in the column is long which ordinarily negatively affects flavor. Also, pressure drops across the bed are likely to be high.

It is an object of this invention to provide a process for the continuous extraction of water soluble substances from solids which contain them, especially to provide a beverage products of good flavor.

SUMMARY OF THE INVENTION

Accordingly, in one aspect, this invention provides a process for the continuous extraction of water soluble substances from solids containing the substances, the process comprising:

introducing a slurry containing the solids to be extracted and an extract into a tubular reactor immediately above a solid-liquid separator, the solids forming an upwardly moving packed bed above the solid-liquid separator while the extract drains through the solid-liquid separator;

scraping solids from the packed bed for defining an upper surface of the packed bed;

introducing an extraction liquid into the tubular reactor above the upper surface of the packed bed, a portion of the extraction liquid percolating through the packed bed for extracting water soluble substances from the solids in the packed bed and draining through the solid-liquid separator as an extract, the remaining portion of the extraction liquid entraining the solids scraped from the packed bed for providing a spent solids slurry;

removing the spent solids slurry from the tubular reactor; and removing extract from below the solid-liquid separator.

The process has the advantage that it enables extraction to be carried out in a manner which is decoupled from any solubilization steps. Therefore the extract is not subjected to solubilization and, for beverages, no off-flavor generation occurs in the extract. Also, the spent solids may be subjected to solubilization under favorable and precisely controlled conditions. Further, because the solids are introduced into the tubular reactor in the form of a slurry, the solids are evenly wetted and de-gassed prior to entering the tubular reactor. Therefore channeling of the liquid in the tubular reactor is minimized. Further the process enables the use of a packed bed of reduced height which results in lower pressures drops and lower residences times of the extract within the packed bed.

In another aspect, this invention provides a process for the extraction of water soluble substances from solids containing the substance, the process comprising:

introducing fresh solids into a first extraction reactor in the form of a slurry and causing the solids to form an upwardly moving packed bed in the first extraction reactor, introducing a first extraction liquid into the first extraction reactor above the upwardly moving packed bed and at a temperature of about 80° C. to about 180° C., a portion of the first extraction liquid percolating through the upwardly moving packed bed for providing a first extract, the remaining portion of the first extraction liquid entraining partially spent solids from the first extraction reactor;

filtering the extraction liquid from the partially spent solids to provide a first filtrate and partially spent solids;

thermally solubilizing the partially spent solids at a temperature of about 150° to about 260° C. for about 1 to about 15 minutes for providing solubilized solids;

introducing the solubilized solids into a second extraction reactor in the form of a slurry and causing the solubilized solids to form an upwardly moving packed bed in the second extraction reactor, introducing a second extraction liquid into the second extraction reactor above the upwardly moving packed bed and at a temperature of about 80° C. to about 180° C., a portion of the second extraction liquid percolating through the upwardly moving packed bed for providing a second extract, the remaining portion of the second extraction liquid entraining partially spent grounds from the second extraction reactor; and collecting at least a portion of the first extract leaving the first extraction reactor.

Preferably the process further comprises collecting at least a portion of the second extract leaving the second extraction reactor for providing the first extraction liquid.

The process may further comprise:

filtering the second extraction liquid from the partially spent solids leaving the second extraction reactor;

thermally solubilizing the partially spent grounds at a temperature of about 150° to about 260° C. for about 1 to about 15 minutes for providing solubilized solids;

introducing the solubilized solids into a third extraction reactor in the form of a slurry and causing the solubilized solids to form an upwardly moving packed bed in the third extraction reactor, and introducing a third extraction liquid into the third extraction reactor above the upwardly moving packed bed and at a temperature of about 80° C. to about 180° C., a portion of the third extraction liquid percolating through the upwardly moving packed bed for providing a third extract, the remaining portion of the third extraction liquid entraining partially spent grounds from the third extraction reactor.

Preferably the process further comprises collecting at least a portion of the third extract leaving the third extraction reactor for providing the second extraction liquid.

The solids are preferably coffee grounds or tea leaves and the water soluble substances are preferably soluble coffee solids and soluble tea solids.

In another aspect, this invention provides a soluble coffee product which contains carbohydrates obtained exclusively from roasted coffee beans, the soluble coffee product comprising at least about 40%% by weight of total sugars of which at least about 5.5% by weight are free sugars and at least about 10% by weight are mono-, di- and oligo-saccharides which contains 3 to 10 saccharide units. Preferably the soluble coffee product comprises at least about 6% by weight of free sugars; for example about 6.5% to about 7.5%. Further the soluble coffee product preferably comprises at least about 12% by weight are mono-, di- and oligo-saccharides; for example about 14% to about 18%. The product preferably comprises about 42% to about 45% total sugars.

BRIEF DESCRIPTION OF THE DRAWINGS

Embodiments of the invention are now described, by way of example only, with reference to the drawings in which.

DETAILED DESCRIPTION OF THE PREFERRED EMBODIMENTS

The invention will be described in detail in relation to a coffee extraction process. However, it is to be appreciated that the process is not limited to coffee extraction. The process is in fact applicable to the extraction of many water soluble substances from solids which contain them.

Figure 1:
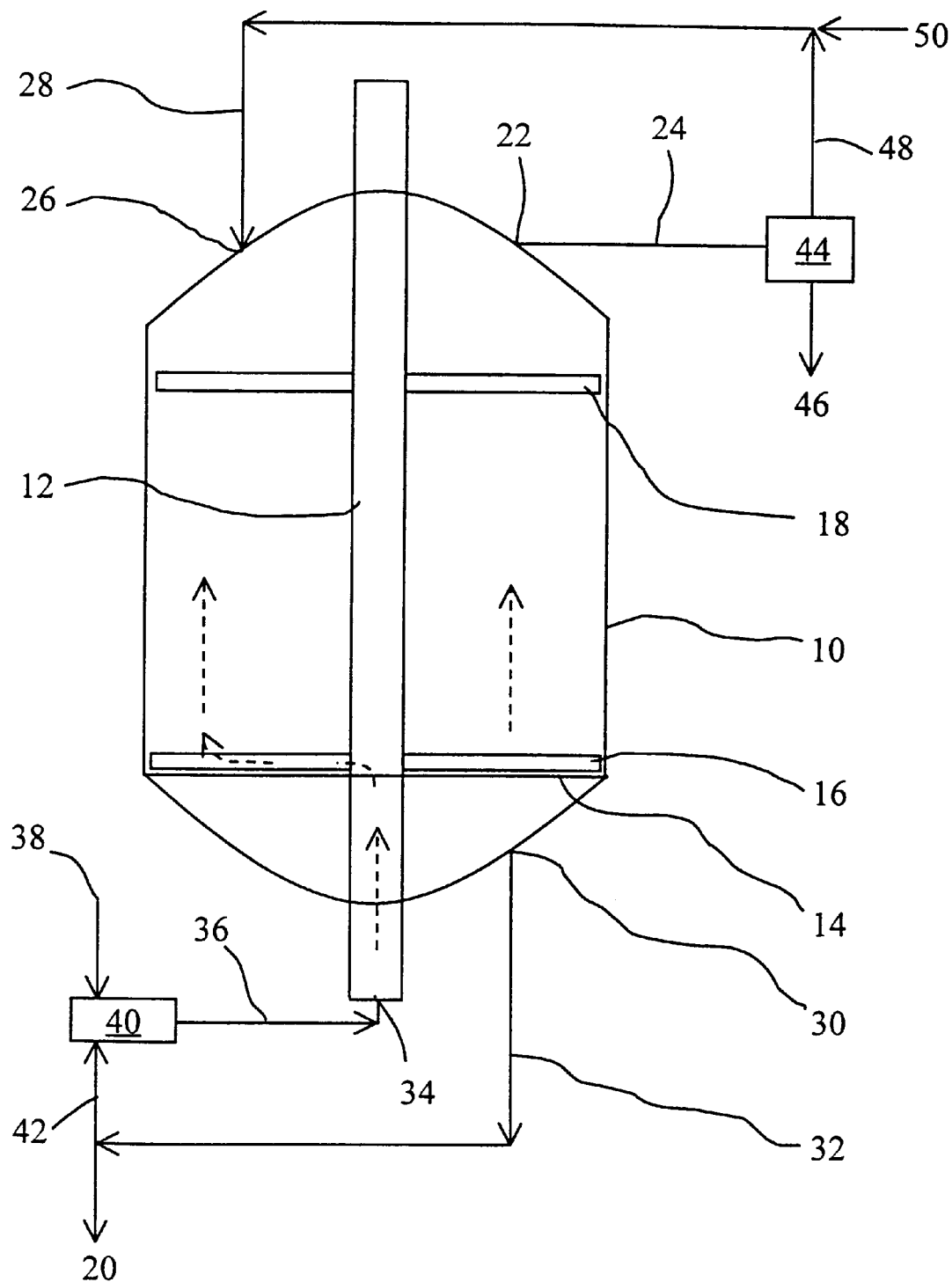
FIG. 1 is a schematic view of a single stage of a coffee extraction system.

An example of a single stage of a coffee extraction system is illustrated in FIG. 1. The system comprises a tubular extraction reactor 10 which is mounted vertically. A rotatable feed tube 12 extends through the extraction reactor 10 along its axis, from the lower end of the extraction reactor 10 to the upper end. The feed tube 12 may comprise two co-axially aligned shafts (not shown). The shafts of the feed tube 12 are connected to one or more motors (not shown) which drive the rotation of shafts making up the feed tube 12. A screen 14 extends across the extraction reactor 10 near its lower end. The apertures of the screen 14 are sized to permit liquid to flow through the screen 14 but not coffee grounds.

Wiper blades 16 extend radially outwardly from the feed tube 12 immediately above the screen 14. The wiper lades 16 are orientated to impart an upwardly directed force on coffee grounds within the extraction reactor 10. Any number of wiper blades 16 may be used. A liquid distributor (not shown) is connected to the feed tube 12 such that slurry within the feed tube 12 may flow into the tubular reactor 10 through the liquid distributor. An example of a liquid distributor is a distributor pipe extending radially outwardly from the feed tube 12 and having one or more outlets along its length. If desired, more than one distributor pipe may be used.

A set of scraping blades 18 extend radially outwardly from the feed tube 12 near the top of the extraction reactor 10. Any number of scraping blades 18 may be used. The scraping blades 18 are conveniently releasably attached to the feed tube 12 so that their position on the feed tube 12 may be adjusted as desired. Also, if desired, the scraping blades 18 of the set are preferably attached to a different shaft than the wiper blades 16 such that the scraping blades 18 may rotate in counter-rotation to the wiper blades 16.

The extraction reactor 10 also has an upper outlet 22 for the removal of spent grounds slurry 24, an upper inlet 26 for the introduction of dilute extraction liquid 28, and a lower outlet 30, positioned beneath the screen 14, for the removal of coffee extract 32. The feed tube 12 is provided with a lower inlet 34 for the introduction of a coffee grounds slurry 36 into the feed tube 12 and hence into the extraction reactor 10.

In use, the shafts of the feed tube 12 are rotated. Coffee grounds 38 are fed into a mixer 40 in which they are slurried with a recycled coffee extract 42. The resulting coffee grounds slurry 36 is then fed into the feed tube 12 through the lower inlet 34. A pump (not shown) may be used to introduce the coffee grounds slurry 36 into the feed tube 12. The slurry then flows up the feed tube 12, into the distributor pipe, and into the extraction reactor 10. The flow path of the coffee grounds is indicated by the broken arrows in FIG. 1. Upon entering the extraction reactor 10, the coffee grounds in the slurry are held above the screen 14 where they form a packed bed. The liquid in the slurry drains through the screen 14.

The wiper blades 16, which rotate with a shaft of the feed tube 12, impart an upwardly directed force on the coffee grounds causing the coffee grounds in the packed bed to move steady upwards. Fresh grounds entering the extraction reactor 10 through the distributor pipe fill the void left by upwardly moving coffee grounds. The coffee grounds in the packed bed, while moving upwards relative to the screen 14, remain in substantially fixed positions with respect to each other; especially near the top of the packed bed.

The scraping blades 18, which are also rotating with a shaft of the feed tube 12, remove the coffee grounds from the packed bed. Therefore the scraping blades 18 define the upper level of the packed bed. Consequently, by setting the position of the scraping blades 18, the depth of the packed bed may be readily set.

A dilute extraction liquid 28 enters the extraction reactor 10 through the upper inlet 26. A portion of the dilute extraction liquid 28 percolates downwardly through the packed bed, extracting soluble coffee solids from the coffee grounds as it progresses. The remainder of the dilute extraction liquid 28 entrains the coffee grounds scraped off the packed bed by the scraping blades 18 and transports these coffee grounds out through upper outlet 22 as the spent grounds slurry 24. The spent grounds slurry 24 is then filtered in a filter 44 to remove the partially extracted grounds 46. The filter 44 is conveniently a centrifuge. The filtrate 48 from the filter 44 is then combined with fresh extraction liquid 50 and returned to the extraction reactor 10 as the dilute extraction liquid 28.

The liquid which flows through the screen 14 into the bottom of the extraction reactor 10 is made up of liquid which has percolated through the packed bed and the liquid in the coffee grounds slurry 36. The liquid therefore contains extracted coffee solids. The liquid leaves the extraction reactor 10 through the lower outlet 30 as the coffee extract 32. The coffee extract 32 is then split into two streams; the recycled coffee extract 42 which is fed to the mixer 40 for slurrying the fresh coffee grounds, and a product coffee extract 20. If desired, the coffee extract 32 may be subjected to clarification prior to being split into the two streams.

The temperature of operation in the extraction reactor 10 may be selected as desired. However, the temperature will usually be in the range of about 80° C. to about 180° C.; for example about 100° C. to about 150° C. If desired, suitable heat exchangers may be incorporated into the system to heat either or both of the dilute extraction liquid 28 and the coffee grounds slurry 36.

The size of the particles making up the coffee grounds are suitably within the range of about 0.5 mm to whole roast beans; preferably about 1 mm to about 2 mm. For example, the particle size may be about 1.2 mm to about 1.8 mm. Therefore coffee grounds of small particle size may be used which permits efficient and fast extraction.

The height of the packed bed which forms in the extraction reactor 10 may be selected as desired. However, bed heights in the range of about 0.4 m to about 0.8 m are generally found to be suitable. Preferably the ratio of the bed height to the diameter of the bed is less than about 1.5:1; more preferably less than about 1:1. For example, the ratio of the bed height to the diameter of the bed may be less than about 0.5:1. Use of packed beds of these height to diameter ratios offers the advantage of lower pressure drops; for example less than about 50 kPa.

Figure 2:
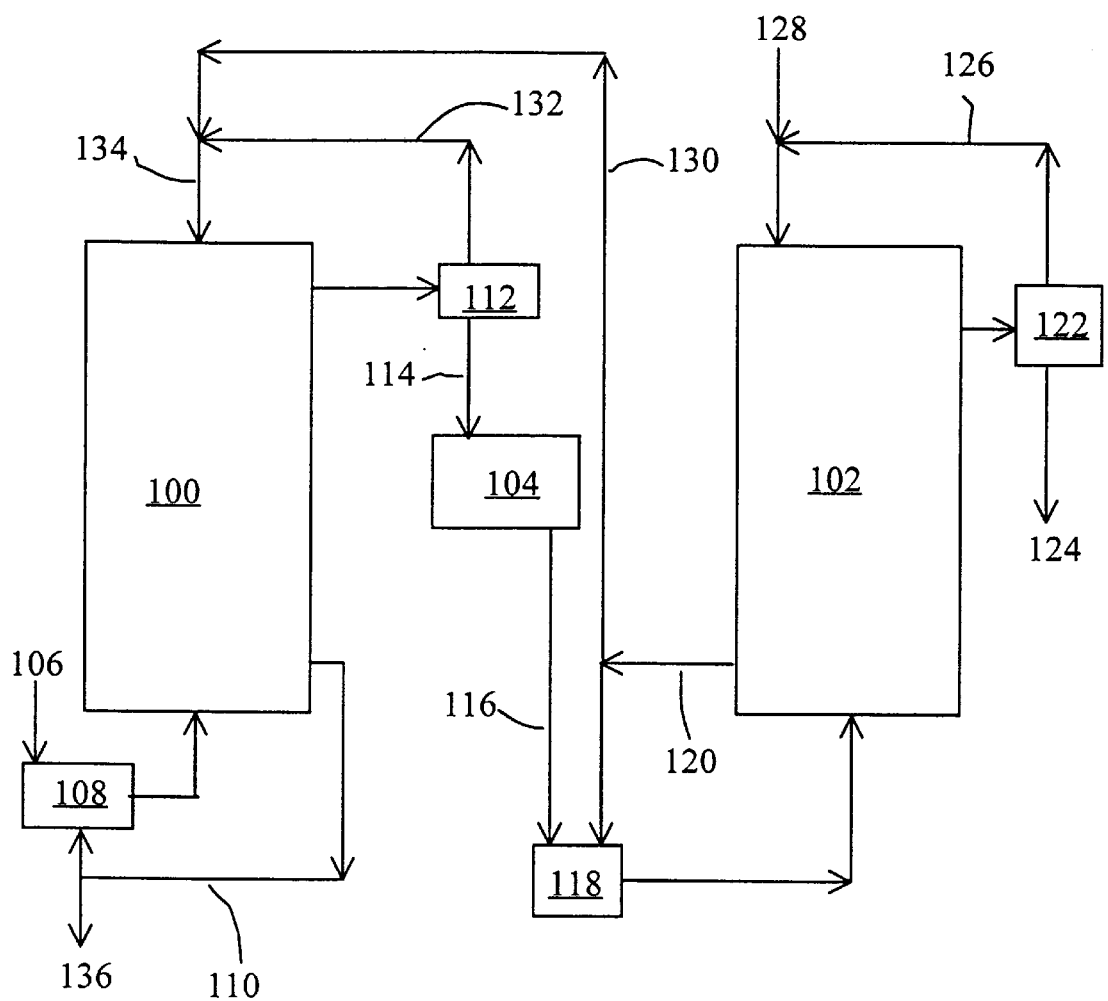
FIG. 2 is a flow diagram of a two-stage coffee extraction system.

The coffee extraction process may comprise the use of more than one extraction reactor and may include solubilization stages. For example, as illustrated in FIG. 2, the coffee extraction process may have two extraction reactors 100, 102 and a solubilization reactor 104. The two extraction reactors 100, 102 are substantially as described above. Fresh coffee grounds 106 are slurried in a first mixer 108 and then introduced into the first reactor 100. A portion of the coffee extract 110 leaving the first reactor 100 is used to slurry the fresh coffee grounds 106. The remaining portion is collected as the product extract 136. The spent grounds slurry leaving the first reactor 100 is filtered in a first filter 112.

The partially extracted grounds 114 leaving the first filter 112 are then transferred to the solubilization reactor 104. The solubilization reactor 104 may be any suitable reactor which is able to withstand high temperatures and pressures. For example, the solubilization reactor may be a fixed bed reactor, an autoclave, a plug flow reactor, a tubular reactor with an auger or transporting blender, an extruder, or the like. The design of the solubilization reactor is a matter of choice and has no critical impact on the process.

In the solubilization reactor 104, the partially extracted grounds are subjected to thermal solubilization; for example by heating to a temperature of from about 150° C. to about 260° C. for a time of about 1 minute to about 15 minutes. Temperatures of about 180° C. to about 220° C. are preferred. The heating may be accomplished using steam; preferably by direct injection of steam.

The solubilized grounds 116 leaving the solubilization reactor 104 are transferred to a second mixer 118. The partially extracted grounds 106 are slurried in the second mixer 118 using portion of the coffee extract 120 leaving the second reactor 102. The resulting slurry is then introduced into the second reactor 102. The spent grounds slurry leaving the second reactor 102 is filtered in a second filter 122. The extracted grounds 124 obtained from the second filter 122 are then sent to waste or other treatment. The filtrate 126 obtained from the second filter 122 is combined with fresh water 128 and introduced into the top of the second extraction reactor 102.

The portion 130 of the coffee extract 120 leaving the second extraction reactor 102 which is not recycled to the second mixer 118, is then combined with the filtrate 132 obtained from the first filter 112. The combination is then introduced into the top of the first extraction reactor 100 as the dilute extraction liquid 134. If desired, additional fresh water may be added to the portion 130 of the coffee extract 120 which is combined with the filtrate 132.

In this way, the coffee grounds undergo two counter-current extraction steps separated by a solubilization step. Further, the overall process is also counter-current in that the fresh extraction liquid enters the system at the second extraction reactor 102, where the spent grounds 124 are discharged. At the other end of the extraction process, fresh coffee grounds 106 are introduced into the system and the coffee extract 136 is collected. The extraction liquid, however, is not subjected to the solubilization step and therefore the formation of off flavors and loss of yield, both of which arise when coffee extracts are subjected to solubilization, are avoided.

Figure 3:
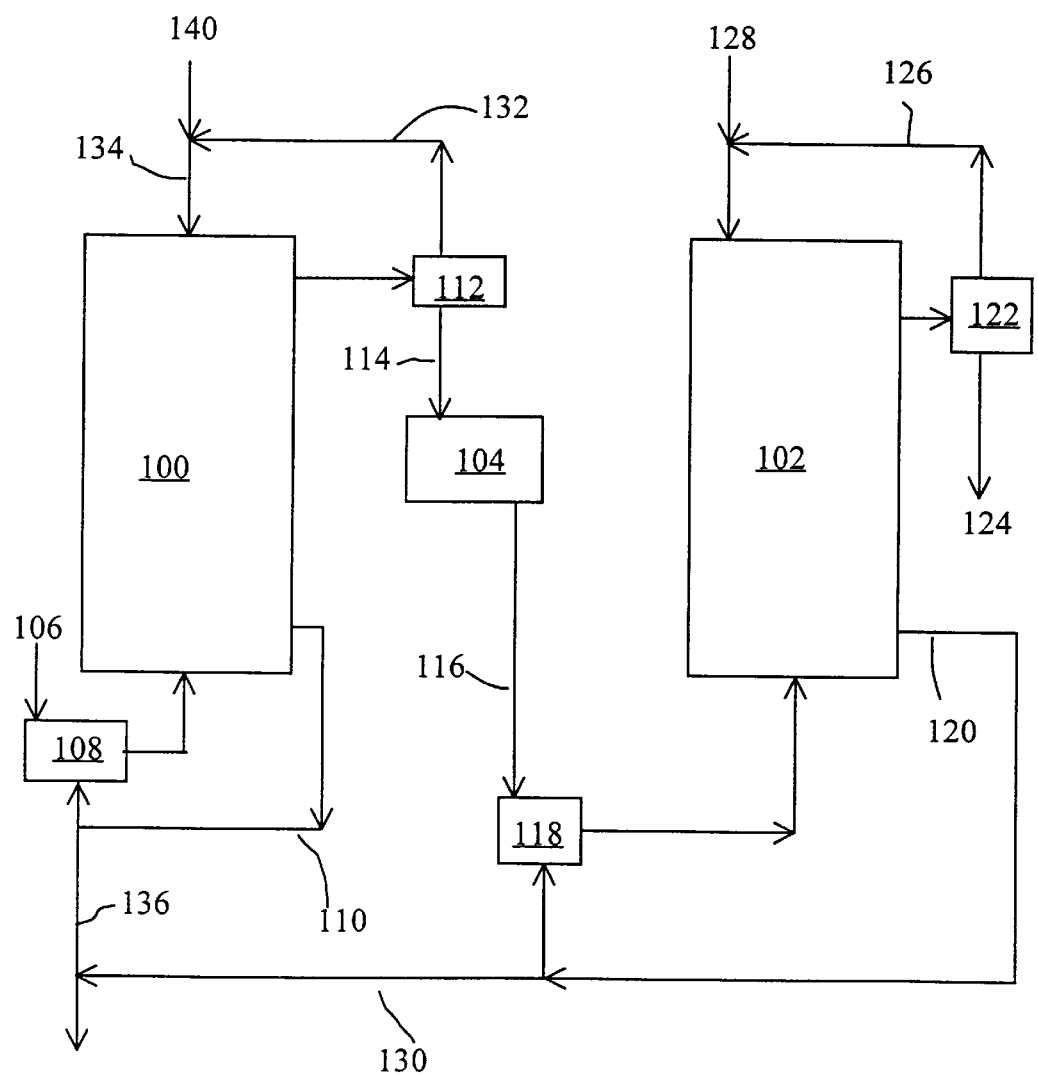
FIG. 3 is a flow diagram of another two-stage coffee extraction system.

It will be appreciated that it is not necessary to arrange the system as illustrated in FIG. 2. For example, it is not necessary to direct a portion 130 of the coffee extract 120 from the second extraction reactor 102 to the first extraction reactor 100. Instead, the portion 130 may be collected and combined with the product extract 136 leaving the first extraction reactor 100. In this case, fresh water 140 may be combined with the filtrate 132 leaving the first filter 112. This is best illustrated in FIG. 3.

Figure 4:
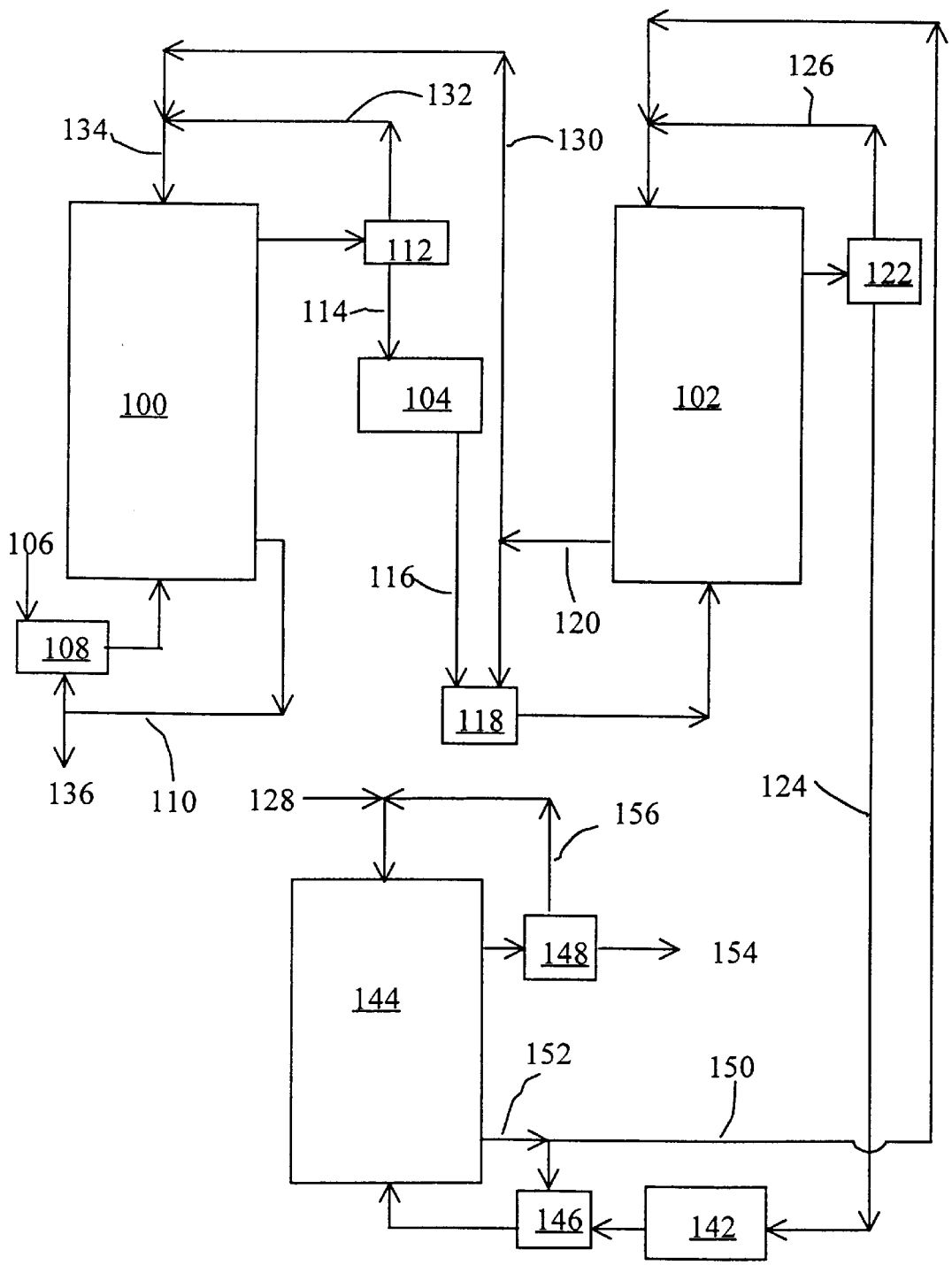
FIG. 4 is a flow diagram of a three-stage coffee extraction system.

Also, it will be appreciated that additional extraction reactors and solubilization reactors may be connected to the system as desired. For example, as illustrated in FIG. 4, the coffee extraction process may have a third extraction reactor 144 and a second solubilization reactor 142. The extraction reactor 144 and solubilization reactor 142 are substantially as described above with reference to FIGS. 1 to 3. The extracted grounds 124 leaving the second filter 122 are then transferred to the second solubilization reactor 142 where they are solubilized as described above.

The solubilized grounds leaving the second solubilization reactor 142 are transferred to a third mixer 146. The solubilized grounds are slurried in the third mixer 146 using portion of the coffee extract 152 leaving the third reactor 144. The resulting slurry is then introduced into the third reactor 144 as described above. The spent grounds slurry leaving the third reactor 144 is filtered in a third filter 148. The extracted grounds 154 obtained from the third filter 148 are then sent to waste or other treatment. The filtrate 156 obtained from the third filter 148 is combined with fresh water 128 and introduced into the top of the third extraction reactor 144.

The portion 150 of the coffee extract 152 leaving the third extraction reactor 144 which is not recycled to the third mixer 146, is then combined with the filtrate 126 obtained from the second filter 122. The combination is then introduced into the top of the second extraction reactor 102 as the dilute extraction liquid.

Of course, it is not necessary to direct a portion 150 of the coffee extract 152 from the third extraction reactor 144 to the second extraction reactor 102. Instead, the portion 150 may be collected and combined with the product extract 136 leaving the first extraction reactor 100. In this case, fresh water may be combined with the filtrate 126 leaving the second filter 122 and used as the dilute extraction liquid for the second extraction reactor 102. Similarly, as described in connection with FIG. 3, it is not necessary to direct a portion 130 of the coffee extract 120 from the second extraction reactor 102 to the first extraction reactor 100. Instead, the portion 130 may be collected and combined with the product extract 136 leaving the first extraction reactor 100. Further, additional fresh water may be added to the portions 130, 150 of the coffee extracts 120, 152 which are introduced into the reactors 100, 102 as the dilute extraction liquids.

Further, instead of using more than one extraction reactor, additional extraction stages may be provided by using fixed bed reactors or other suitable reactors. However, the use of the extraction reactors for all additional extraction stages is preferred since coffee products having better flavor profiles are obtained.

The coffee extract obtained from the process may be processed as desired into soluble coffee powder. Usually, the coffee extract is stripped using steam to remove aroma volatiles, concentrated, and then spray- or freeze-dried. These procedures are well known, are well described in the literature, and have no critical impact on the invention. Aroma may also be recovered from the roast and ground coffee prior to any extraction by any well known procedure like gas stripping, steaming and the like.

If desired, it is possible to replace the screen 14 in the tubular reactor 10 illustrated in FIG. 1 with a wall, which may be the lower wall of the tubular reactor 10. Then, suitable screens (not shown) may be provided in the side walls of the tubular reactor 10 near the lower end of the tubular reactor 10. In this case, the extract 32 drains through the screens in the side walls instead of through the screen 14.

EXAMPLE 1

An extraction system made up of two extraction reactors and a solubilization reactor is used. The reactors are connected as illustrated in FIG. 2. The extraction reactors have a diameter of about 0.6 m and. Coffee grounds of average particle size of about 1.3 mm to about 1.4 mm are used.

About 330 kg/hr of fresh coffee grounds are slurried with coffee extract and fed into the first extraction reactor at a temperature of about 90° C. Water is combined with a filtrate obtained from the second extraction reactor and fed into the second extraction reactor as an extraction liquid. The temperature of the extraction liquid is about 110° C. The draw-off ratio for the system is about 4:1 and the bed height is about 0.5 m.

A portion of the coffee extract obtained from the second extraction reactor is combined with a filtrate obtained from the first extraction reactor and fed into the first extraction reactor as an extraction liquid. The temperature of the extraction liquid is about 130° C.

The partially extracted grounds obtained from the first extraction reactor are fed into the solubilization reactor and subjected to thermal solubilization at about 198° C. for about 5 minutes. The solubilized grounds leaving the solubilization reactor are slurried with the remaining portion of the coffee extract obtained from the second extraction reactor fed into the second extraction reactor at a temperature of about 96° C.

The coffee extract product leaving the first extraction reactor is collected and the soluble coffee solids content is determined. The yield is about 49% on the basis of fresh coffee grounds entering the system. The coffee extract product is then processed to coffee powder in the normal manner. The coffee powder is dissolved in hot water and the coffee beverage tasted by a panel. The coffee beverage is determined to have a full bodied, roasty flavor.

For comparison, a conventional coffee powder is produced using fixed bed reactors arranged to provide two extraction stages separated by a solubilization stage. The system is operated under conditions to obtain a yield of 49%. A coffee beverage produced from the conventional coffee powder is characterized by the panel as having a full, strong but harsh flavor.

EXAMPLE 2

An extraction system made up of three extraction reactors and two solubilization reactor is used. The reactors are connected as follows: a first extraction reactor, a first solubilization reactor, a second extraction reactor, a second solubilization reactor, and a third extraction reactor.

The fresh coffee grounds enter the first extraction reactor and are then transported through each reactor in turn, leaving the system after passing through the third extraction reactor. Water enters the system by being combined with a filtrate obtained from the third extraction reactor. The combination is fed into the third extraction reactor as an extraction liquid at a temperature of about 120° C. A portion of the coffee extract leaving the third extraction reactor is recycled back into the third extraction reactor while the remainder is fed to the second extraction reactor. Similarly a portion of the coffee extract leaving the second extraction reactor is recycled back into the second extraction reactor while the remainder is fed to the first extraction reactor. The temperature of the extraction liquid fed into the first and second extraction reactors is about 120° C. The ratio of the bed heights to bed diameters is about 0.33:1.

The partially extracted coffee grounds leaving the first extraction reactor are subjected to thermal solubilization in the first solubilization reactor at about 190° C. for about 3 minutes. The partially extracted coffee grounds leaving the second extraction reactor are subjected to thermal solubilization in the second solubilization reactor at about 204° C. for about 8 minutes.

The coffee extract product leaving the first extraction reactor is collected and the soluble coffee solids content is determined. The yield is about 52.5% on the basis of fresh coffee grounds entering the system. The coffee extract product is then processed to coffee powder in the normal manner. The coffee powder is labeled as Sample 1.

Sample 1 is then analyzed to determine the free sugar content, the total sugar content, mono-saccharide content, the di-saccharide content, and the content of oligo-saccharides containing 3 to 10 saccharides units.

Three soluble coffee products which are commercially available in the US are obtained from a local supermarket. These soluble coffee products are labeled as Samples A, B and C. Samples A, B and C are then analyzed to determine the free sugar content, the total sugar content, mono-saccharide content, the di-saccharide content, and the content of oligo-saccharides containing 3 to 10 saccharides units. The results are as follows:

|  | Sample 1 (%) | Sample A (%) | Sample B (%) | Sample C (%) |
| --- | --- | --- | --- | --- |
| Free Sugars |  |  |  |  |
| Arabinose | 2.37 | 2.95 | 1.10 | 1.02 |
| Galactose | 1.17 | 1.13 | 0.58 | 0.51 |
| Glucose | 0.61 | 0.23 | 0.12 | 0.14 |
| Mannose | 2.12 | 0.62 | 0.42 | 0.35 |
| Fructose | 0.84 | — | 0.23 | 0.26 |
| Sucrose | 0.12 | 0.13 | 0.16 | 0.15 |
| Total | 7.23 | 5.07 | 2.61 | 2.43 |
| Total Sugars |  |  |  |  |
| Arabinose | 3.09 | 3.33 | 4.06 | 4.04 |
| Galactose | 20.87 | 22.48 | 21.52 | 21.08 |
| Glucose | 0.89 | 0.40 | 1.08 | 1.52 |
| Mannose | 18.97 | 14.37 | 11.87 | 10.18 |
| Total | 43.82 | 40.58 | 38.53 | 36.81 |
| Mono-saccharides | 7.11 | 4.94 | 2.45 | 2.28 |
| Di-saccharides | 2.26 | 1.03 | 0.49 | 0.41 |
| Oligo(3-10)-saccharides | 6.79 | 4.32 | 1.96 | 1.82 |
| Total | 16.16 | 10.29 | 4.90 | 4.51 |

Sample 1 has a higher free sugar content, total sugar content, mono-saccharide content, di-saccharide content, and oligo-saccharide content than the commercially available samples.

EXAMPLE 3

An extraction system made up of three extraction reactors and two solubilization reactor is used. The reactors are connected as follows: a first extraction reactor, a first solubilization reactor, a second extraction reactor, a second solubilization reactor, and a third extraction reactor.

The fresh coffee grounds enter the first extraction reactor and are then transported through each reactor in turn, leaving the system after passing through the third extraction reactor. Water is introduced into the system at the first and third extraction reactors.

For the third extraction reactor, the water is combined with a filtrate obtained from the third extraction reactor. The combination is fed into the third extraction reactor as an extraction liquid at a temperature of about 110° C. The draw off ratio, based on fresh coffee grounds, is about 5:1. A portion of the coffee extract leaving the third extraction reactor is recycled back into the third extraction reactor while the remainder is fed to the second extraction reactor.

A portion of the coffee extract leaving the second extraction reactor is recycled back into the second extraction reactor while the remainder is collected. The temperature of the extraction liquid fed into the second extraction reactor is about 110° C. The yield over the second and third extraction reactors is about 27.5%.

For the first extraction reactor, the water is combined with a filtrate obtained from the first extraction reactor. The combination is fed into the first extraction reactor as an extraction liquid at a temperature of about 120° C. The draw off ratio, based on fresh coffee grounds, is about 4:1. The yield over the first extraction reactor is about 27.5%.

The partially extracted coffee grounds leaving the first extraction reactor are subjected to thermal solubilization in the first solubilization reactor at about 190° C. for about 3 minutes. The partially extracted coffee grounds leaving the second extraction reactor are subjected to thermal solubilization in the second solubilization reactor at about 204° C. for about 8 minutes.

The yield over the system is about 55% on the basis of fresh coffee grounds entering the system. The coffee extract product is then processed to coffee powder in the normal manner. The coffee powder is dissolved in hot water and the coffee beverage tasted by a panel. The coffee beverage is determined to have a full bodied, roasty flavor.

EXAMPLE 4

The extraction system described in example 1 is used to extract soluble tea solids from tea leaves. The operating conditions are substantially as described in example 1. A soluble tea powder of good flavour is obtained.

It is to be appreciated that numerous modifications and variations may be made to the embodiments and examples described above without departing from the invention.

We claim:

1. A process for the continuous extraction of water soluble substances from solid particles containing the substances, the process comprising:

introducing a slurry containing solid particles to be extracted and an extract into a tubular reactor immediately above a stationary solid-liquid separator, the solid particles forming an upwardly moving packed bed above the solid-liquid separator while the extract drains through the solid-liquid separator;

scraping solid particles from the packed bed for defining an upper surface of the packed bed;

introducing an extraction liquid into the tubular reactor above the upper surface of the packed bed, with a first portion of the extraction liquid percolating through the packed bed for extracting water soluble substances from the solid particles in the packed bed and draining through the solid-liquid separator as an extract, and a second portion of the extraction liquid entraining the solid particles scraped from the packed bed for providing a spent particles slurry;

removing the spent particles slurry from the tubular reactor; and removing extract from below the solid-liquid separator as an extract product.

2. A process according to claim 1 further comprising rotating at least one blade immediately above the solid-liquid separator for imparting an upwardly directing force upon the solid particles, the blade having a leading edge and a trailing edge.

3. A process according to claim 2 in which the slurry is introduced into the tubular reactor adjacent the trailing edge of the rotating blade.

4. A process according to claim 1 further comprising mixing a portion of the extract product with solid particles for providing the slurry.

5. A process according to claim 1 further comprising filtering the spent particles slurry for providing a filtrate and spent particles; and introducing the filtrate into the tubular reactor as a portion of the extraction liquid.

6. A process according to claim 1 in which the solid particles in the slurry have a particle size of about 0.5 mm to about 2 mm.

7. A process according to claim 1 in which the solid particles are coffee grounds and the water soluble substances are soluble coffee solids.

8. A process for the extraction of water soluble substances from solid particles containing the water soluble substances, the process comprising:

introducing fresh solid particles into a first extraction reactor in the form of a slurry and causing the solid particles to form an upwardly moving packed bed in the first extraction reactor, introducing a first extraction liquid into the first extraction reactor above the upwardly moving packed bed and at a temperature of about 80° C. to about 180° C., with a first portion of the first extraction liquid percolating through the upwardly moving packed bed for providing a first extract, and a second portion of the first extraction liquid entraining partially spent particles from the first extraction reactor;

filtering the extraction liquid from the partially spent particles to provide a first filtrate and first partially spent particles;

thermally solubilizing the first partially spent particles at a temperature of about 150° to about 260° C. for about 1 to about 15 minutes for providing first solubilized particles;

introducing the first solubilized particles into a second extraction reactor in the form of a slurry and causing the first solubilized particles to form an upwardly moving packed bed in the second extraction reactor, introducing a second extraction liquid into the second extraction reactor above the upwardly moving packed bed and at a temperature of about 80° C. to about 180° C., with a first portion of the second extraction liquid percolating through the upwardly moving packed bed for providing a second extract, and a second portion of the second extraction liquid entraining partially spent particles from the second extraction reactor; and collecting at least a portion of the first extract leaving the first extraction reactor for providing the extract product.

9. A process according to claim 8 in which the first partially spent particles are solubilized at a temperature of about 180° C. to about 220° C.

10. A process according to claim 8 further comprising mixing a portion of the first extract with fresh solid particles for providing the slurry introduced into the first extraction reactor; and mixing a portion of the second extract with the first solubilized particles for providing the slurry introduced into the second extraction reactor.

11. A process according to claim 8 further comprising introducing the first filtrate into the first extraction reactor as a portion of the first extraction liquid.

12. A process according to claim 8 further comprising filtering the second extraction liquid from the partially spent particles leaving the second reactor to provide a second filtrate and second partially spent solids; and introducing the second filtrate into the second extraction reactor as a portion of the second extraction liquid.

13. A process according to claim 8 further comprising:

filtering the second extraction liquid from the partially spent particles leaving the second extraction reactor to provide a second filtrate and second partially spent solids;

thermally solubilizing the second partially spent solids at a temperature of about 180° to about 240° C. for about 1 to about 15 minutes for providing second solubilized solids;

introducing the second solubilized solids into a third extraction reactor in the form of a slurry and causing the second solubilized solids to form an upwardly moving packed bed in the third extraction reactor, introducing a third extraction liquid into the third extraction reactor above the upwardly moving packed bed and at a temperature of about 80° C. to about 180° C., with a first portion of the third extraction liquid percolating through the upwardly moving packed bed for providing a third extract, and a second portion of the third extraction liquid entraining partially spent particles from the third extraction reactor.

14. A process according to claim 13 in which the second partially spent solids are solubilized at a temperature of about 180° C. to about 220° C.

15. A process according to claim 13 further comprising mixing a portion of the third extract with the second solubilized solids for providing the slurry introduced into the third extraction reactor.

16. A process according to claim 13 further comprising introducing the second filtrate into the second extraction reactor as a portion of the second extraction liquid.

17. A process according to claim 13 in which each extraction reactor contains a solid-liquid separator, the slurry being introduced into the extraction reactor immediately above the solid-liquid separator, the upwardly moving packed bed forming above the solid-liquid separator.

18. A process according to claim 17 further comprising rotating at least one blade immediately above the solid-liquid separator in each extraction reactor for imparting an upwardly directed force upon the solid particles in the extraction reactor.

19. A process according to claim 8 in which the solid particles are coffee grounds and the water soluble substances are soluble coffee solids.

20. A process according to claim 13 in which the solid particles are coffee grounds and the water soluble substances are soluble coffee solids.

21. A process for the extraction of soluble coffee solids from coffee particles for providing a coffee extract product, the process comprising:

introducing fresh coffee particles into a first extraction reactor in the form of a slurry and causing the coffee particles to form an upwardly moving packed bed in the first extraction reactor, introducing a first extraction liquid into the first extraction reactor above the upwardly moving packed bed and at a temperature of about 80° C. to about 180° C., with a first portion of the first extraction liquid percolating through the upwardly moving packed bed for providing a first coffee extract, and a second portion of the first extraction liquid entraining partially spent particles from the first extraction reactor;

filtering the extraction liquid from the partially spent particles to provide a first filtrate and first partially spent solids;

thermally solubilizing the first partially spent solids at a temperature of about 150° to about 260° C. for about 1 to about 15 minutes for providing first solubilized solids;

introducing the first solubilized solids into a second extraction reactor in the form of a slurry and causing the first solubilized solids to form an upwardly moving packed bed in the second extraction reactor, introducing a second extraction liquid into the second extraction reactor above the upwardly moving packed bed and at a temperature of about 80° C. to about 180° C., with a first portion of the second extraction liquid percolating through the upwardly moving packed bed for providing a second coffee extract, and a second portion of the second extraction liquid entraining partially spent solids from the second extraction reactor;

filtering the second extraction liquid from the partially spent solids leaving the second extraction reactor to provide a second filtrate and second partially spent solids;

thermally solubilizing the second partially spent solids at a temperature of about 180° to about 240° C. for about 1 to about 15 minutes for providing second solubilized solids;

introducing the second solubilized solids into a third extraction reactor in the form of a slurry and causing the second solubilized solids to form an upwardly moving packed bed in the third extraction reactor, introducing a third extraction liquid into the third extraction reactor above the upwardly moving packed bed and at a temperature of about 80° C. to about 180° C., a portion of the third extraction liquid percolating through the upwardly moving packed bed for providing a third coffee extract, a remaining portion of the third extraction liquid entraining partially spent solids from the third extraction reactor; and collecting at least a portion of the first coffee extract leaving the first extraction reactor for providing the coffee extract product.

* * * * *